United States Patent

[11] 3,582,629

[72] Inventor Charles W. Ross
 Hatboro, Pa.
[21] Appl. No. 752,609
[22] Filed Aug. 14, 1968
[45] Patented June 1, 1971
[73] Assignee Leeds & Northrup Company
 Philadelphia, Pa.

[54] DIGITAL PROCESS CONTROL METHOD AVOIDING WINDUP
 5 Claims, 4 Drawing Figs.
[52] U.S. Cl. .................................................. 235/151.1,
 235/151.12, 318/610, 318/626, 318/636
[51] Int. Cl. ...................................................... G06f 15/46
[50] Field of Search .......................................... 235/150.1,
 151—151.1; 340/172.5

[56] References Cited
 UNITED STATES PATENTS
 3,201,572 8/1965 Yetter ........................... 235/151
 3,479,493 11/1969 Jacques et al. ................ 235/151.1

OTHER REFERENCES
 Morley et al. " The Ferranti System and Experience with - direct digital control" p. 90— 100
 Mergler: " A Single loop, two msde, DIGITAL PROCESS CONTROLLER" p. 207— 212 Both papers from: 1965 IEEE International Convention Record. (Part 3-Cornpiders)

*Primary Examiner*—Malcolm A. Morrison
*Assistant Examiner*—Felix D. Gruber
*Attorney*—William G. Miller, Jr. and Raymond F. MacKay ABSTRACT: A method for determining the control signal to be produced by a digital control system by first determining the output desired, determining the maximum possible output allowed by the constraints on the system, comparing them and outputting the desired value if it does not exceed the maximum possible value. Otherwise, that part of the control signal computed from stored values indicative of past control actions which are not effective is determined and that value is then added to the desired output determined for a subsequent control interval to obtain a corrected desired output and prevent windup.

DIGITAL PROCESS CONTROL METHOD AVOIDING WINDUP

BACKGROUND OF THE INVENTION

This invention relates to process control systems of the type in which the process is controlled by a digital computer. More particularly, the invention relates to the method for carrying out digital control utilizing either the velocity or position algorithm while avoiding windup. For the purpose of this description, windup may be defined as the improper storage of information due to limitations on the rate of change and/or amount of change which can be effected in the controlled variable during a particular control interval where the control interval is considered as the portion of the sampling period during which control can be effected.

It is characteristic of digital control systems that there may be an incorrect storage of values indicative of past control actions during a particular control interval if during that interval the limited rate or amount of change of the manipulated variable is effective to constrain the production of the response to the control action called for by the control system. Such a constraint may, for example, be characterized by the limited velocity and/or travel of a valve actuator.

The use of the velocity algorithm presents different problems than systems utilizing the position algorithm, for in the system utilizing the position algorithm the tendency is to improperly store the reset function and thereby accumulate excessive reset action, commonly known as reset windup whereas when utilizing the velocity algorithm the improper storage of proportional and rate functions can occur. It is, of course, necessary to take into account or correct for the windup which develops in a controller, for if the controller is tuned for relatively small disturbances so that the final control element can follow the control algorithm demand rapidly, the different relationship existing as a result of a large disturbance will result in a degraded control characterized by overshoot or sluggish recovery.

The prevention of reset windup has long been a problem in analog control systems and has been solved in numerous ways depending upon the particular structure of the analog system. The problem of windup in digital control systems, however, has not been previously solved although in some digital control systems there has been an attempt to deal with the problem. One such attempt, for example, takes into the account the fact that the proportional and integral terms of the velocity algorithm have opposite signs when the variable under control is moving toward the set point. In those systems it is claimed that the opposing proportional term damps the integral action. It has been suggested for those systems that when the controlled variable is some distance from the set point, only those proportional terms are accepted that have the same signs as the integral terms while others are omitted. Such an approach, however, is inadequate to prevent serious control problems in that it fails to preserve for use in future control intervals the proportional and rate action which cannot be outputted or utilized during a particular control interval as a result of constraints on the system.

SUMMARY OF the INVENTION

The method of the present invention is directed to the calculation of the control signal necessary to provide control action during each control interval of a digital computer control system to correct the process variable under control with minimum windup due to the constraints placed on the control action. The steps include the determination of the desired change in the manipulated variable for each of the control intervals in accordance with the measured deviation of the controlled variable from its set point with the determination of the desired change in the manipulated variable being modified by a windup correcting signal, the determination of the maximum change in the manipulated variable which is permitted during each control interval as a result of the constraints on the control action, comparing the maximum permitted change and the modified desired change, producing a control signal sufficient to cause the modified desired change to occur when that change does not exceed the maximum permitted change or producing a control signal sufficient to cause the maximum permitted change and at the same time produce the windup correcting signal when the modified desired change exceeds the maximum permitted change. The windup correcting signal is calculated as that part of the control signal computed from stored values indicative of past control actions which are not effective during the control interval for which they were calculated due to the existence of the constraints on the control action. There is then a modification of the desired change in the manipulated variable as determined for the subsequent control interval in accordance with the calculated correcting signal so as to prevent windup in the control during subsequent intervals.

DESCRIPTION OF THE PREFERRED EMBODIMENTS

Figure 1:
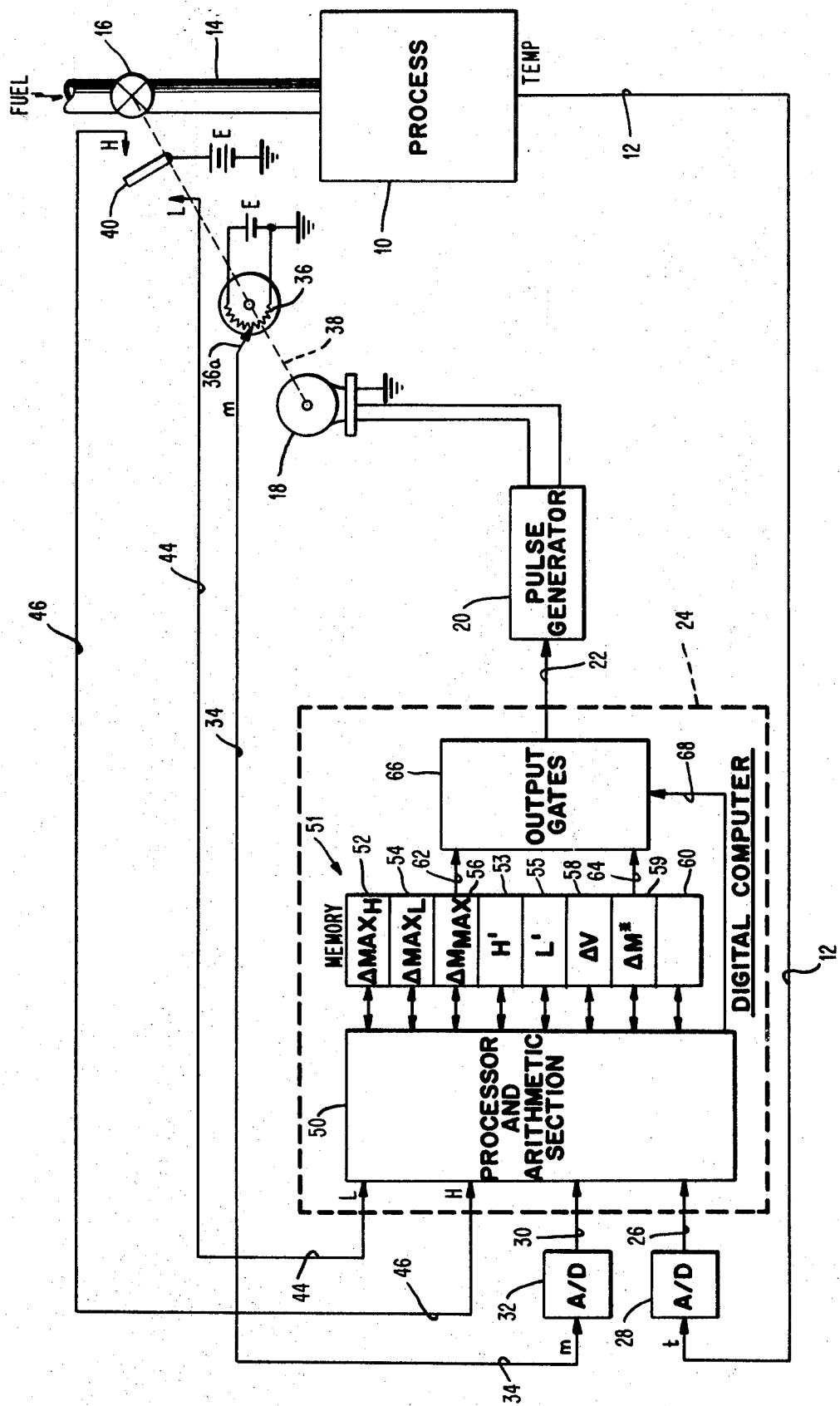
FIG. 1 is a block diagram of one form of digital control system illustrating the present invention.

In FIG. 1 there is shown a digital control system for controlling a process 10 by monitoring the measured variable temperature of the process 10 so as to produce on line 12 a signal related to the temperature measured at a particular point in the process 10. The control of the temperature of the process is carried out by the adjustment of the amount of fuel introduced through line 14 into the process by the adjustment of valve 16. As shown in FIG. 1, valve 16 is positioned by control motor 18 in response to pulses generated by the pulse generator 20. The input of the pulse generator 20 which appears on line 22 is produced as an output from the digital computer 24 which receives as one of its inputs a digital signal on line 26 representative of the temperature "$t$" of the process 10.

The signal on line 26 is provided as an output from the analog to digital converter 28 which has as its input the signal on line 12 which is an analog signal indicative of the temperature measured in the process 10. Another input to the digital computer 24 is provided on line 30 as an output of the analog to digital converter 32 which receives as its input on line 34 a signal "$m$" derived from the contact 36a of slidewire 36 which is rotated by the mechanical coupling 38 which connects motor 18 to valve 16. The slidewire 36 is supplied by potential source E and has one terminal grounded, as shown. There is thus produced from contact 36a an analog signal on line 34 representative of the position of valve 16.

The mechanical coupling 38 also serves to rotate the movable contact member 40 of the limit switch so that it comes into contact with contact L when the valve 16 has reached a lower limit or in contact with contact H when the contact has reached an upper limit. The member 40 is connected by way of potential source E to ground so that there is produced on lines 44 and 46, respectively, a signal indicative of either a lower limit or an upper limit having been reached by the valve 16. The signals appearing on lines 44 and 46 are introduced to the digital computer 24 and are utilized as described subsequently.

The digital computer 24 is shown as comprising a processor and arithmetic section 50 and a memory section 51. The memory section is shown as having a number of memory cells or sections with the section 52 designated $\Delta max_H$ storing a digital word indicative of the maximum change in the position of valve 16 which is either the maximum possible or the maximum permissible change in the increase direction or, in other words, the direction toward the high limit during any single control interval.

The section 54 of the memory 51 stores a digital word $\Delta max_L$ indicative of the maximum change in the position of valve 16 which is possible in the lower direction or, in other words, the direction toward the lower limit L The section 56 of the memory 51 is utilized to store a digital word indicative of the computed maximum change in the position of valve 16 which can be utilized during a particular control interval and is identified as $\Delta M_{max}$.

Sections 53 and 55, respectively, are memory sections in which are stored the digital words representative of the high limit H' and the low limit L' which are predetermined for the valve 16.

Section 58 of the memory 51 may be conveniently labeled $\Delta V$ since it receives at the end of each control interval the windup correcting signal $\Delta V$ which can be applied during the subsequent control interval. Section 59 of the memory is labeled $\Delta M^*$ and is provided to store signals indicative of the desired change in the manipulated variable called for during a control interval. Interconnecting lines are shown connecting the processor and arithmetic section 50 and the individual sections of memory 51 including the memory section 60 which may be representative of the remainder of the memory of the computer 24. Although not specifically shown, a section of the memory will store signals indicative of the temperature set point for the process 10.

Section 56 and section 58 of the memory, namely $\Delta M_{max}$ and $\Delta M^*$, are shown as being connected by lines 62,64 to output gates 66 which output gates are selectively actuated by the signal from line 68 as obtained from the processor and arithmetic section 50 to selectively output either the signal on line 62 or the signal on line 64 derived respectively from sections 56 and 59 of the memory. Whichever signal is outputted appears on line 22 and provides an input to the pulse generator 20 so as to determine, for example, the duration of the pulses produced by the pulse generator 20 during a particular control interval and thereby determine the magnitude of the change in the position of valve 16 which results from the rotation of the motor 18 in response to the pulses.

The manner in which the individual inputs to the computer on lines 26, 30, 44 and 46 are utilized along with the values stored in the memory sections 52—55 to produce an appropriate output on line 22 for the movement of motor 18 and the positioning of valve 16 in avoidance of windup will be described in connection with FIG. 3.

The outputting mode shown in FIG. 1 may be considered a velocity outputting mode since it uses on-off signals which are integrated by the motor 18 to produce the desired position of valve 16.

Figure 2:
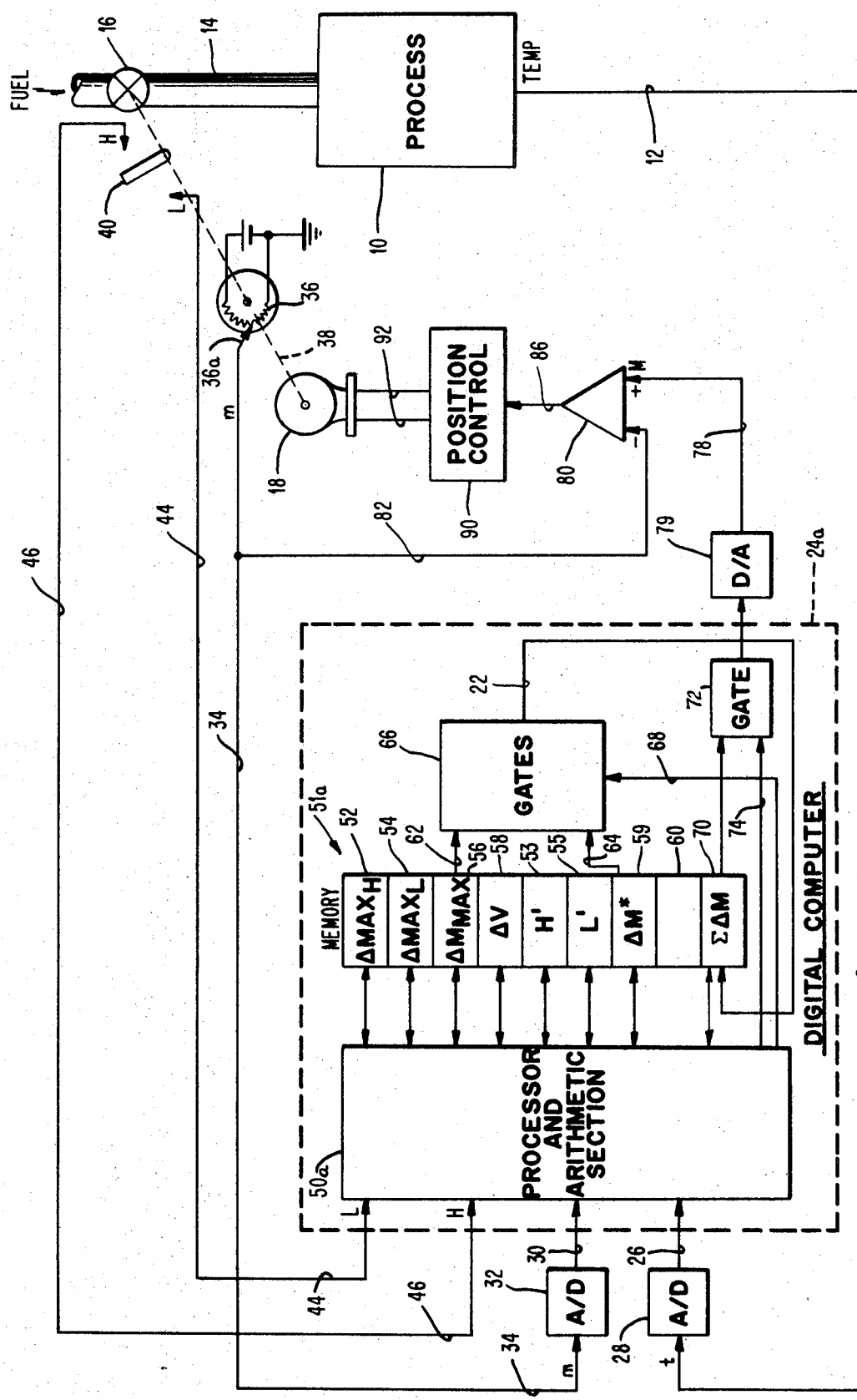
FIG. 2 is a block diagram of another form of digital control system illustrating the present invention.

Another mode of output which may be utilized is the position mode wherein there is produced a signal directly representative of the desired position of the valve 16. A system for producing such a position mode of output is shown in FIG. 2 wherein the process 10 has its temperature controlled by the digital computer 24a in accordance with inputs similar to those shown in FIG. 1 and identified by like reference numerals. The control in FIG. 2 is carried out by the positioning of motor 18 so as to control the position of valve 16 which adjusts the fuel input to the process as shown in FIG. 1. The manner in which the signals are generated for the input to the computer 24a is similar to that shown in FIG. 1 with the elements involved being identified by similar reference characters.

The internal arrangement of the elements of the digital computer 24a differs somewhat from the elements of the digital computer 24 in FIG. 1 in that the memory section 51a includes an additional section 70 identified as $\Sigma \Delta M$. The section 70 of the memory 51a serves to accumulate or sum the output signals gated to line 22, each of which is representative of $\Delta M_n$, the change in calculated valve position for the nth control interval so that there is produced in the section 70 of the memory 51a a digital word representative of the sum of the changes in the valve position which have been calculated for all previous control intervals. That sum can be outputted from the section 70 of memory 51a by the actuation of gate 72 as a result of a signal appearing on line 74 from the processor and arithmetic section 50a so that there is produced on line 78 by way of the digital to analog converter 79 the signal M representative of the desired position of valve 16.

The signal "M" is compared in the comparing amplifier 80 to the signal "m" on line 82 derived from line 34 and representative of the actual position of the valve 16. As a result of this comparison there is produced on line 86 a signal indicative of the deviation of the actual position of the valve 16 from its desired position. That error signal is then utilized in the position control 90 to provide an output on lines 92 to motor 18 so as to cause the motor 18 to move in a direction and to an extent sufficient to make the signal on line 82 equal to that on line 78 thus bringing the position of the valve 16 to its desired position as determined by the digital computer 24a.

The digital computers 24 and 24a of FIGS. 1 and 2, respectively, may be general purpose digital computers which are programmed to provide a signal $\Delta M^*$ indicative of the change in valve position required during each control interval in order to correct the process variable, such as the temperature of the process 10. In computing the value $\Delta M^*$ the computer may be programmed to utilize a velocity algorithm of the form:

$$\Delta M^* = P_n + \Delta I + DAn - P_{n11} - D_{n11}$$

where:

$\Delta M^*$ = Change in valve position desired during the nth control interval $P_n$ = Proportional action $(K_p e_n)$ calculated from the error signal $e_n$ during a control interval n where $K_p$ is the proportional gain and $e_n$ is the difference between the set point and the measured value of the variable being controlled as determined for the interval n.

$\Delta I$ = Change in integral or reset action calculated for a control interval calculated as $$\frac{K_p T_c}{T_i} e_n,$$

where $T_c$ is the sample period and $T_i$ the integral time constant $D_n$ = Derivative or rate action calculated for a control interval, namely $$\frac{K_p T_d}{T_c} (e_n - e_{n-1}),$$

where $T_d$ is the derivative time constant.

or a position algorithm such as, $P_{n11} + D_{n11}$ = the sum of both the proportional action $K_p e_{n11}$ and the derivative or rate action, $$\frac{K_p T_d}{T_c} (e_{n-1} - e_{n-2})$$

for the interval $n-1$, as modified by subtracting the windup correction value $\Delta V$.

$$\Delta M^* = P_n + \Delta I + DAn + I_{11} - M_{n11}$$

where $M$ = the desired position for value 16, the final control element. Thus $$Mn - 1c = \sum_{0}^{n-1} \Delta M$$

$I_{n11}$ = the integral or reset action calculated for the control intervals through $n-1$ as modified by the windup correction value $\Delta V$, or in other words, $$\sum_{n=0}^{n=n-1} (\Delta I - \Delta V)_n.$$

Other forms for either the velocity or position algorithms could, of course, be used.

It is desirable to minimize the windup due to constraints placed on the velocity at which the motor 18 can move valve 16, or the amount of travel of the valve 16, which can be effected in a particular control interval. This can be accomplished by following the method outlined by the flow sheet of FIG. 3 which sets forth the steps to be carried out by the digital computer 24 or computer 24a in order to minimize windup which might occur as a result of the use of the velocity algorithm.

Figure 3:
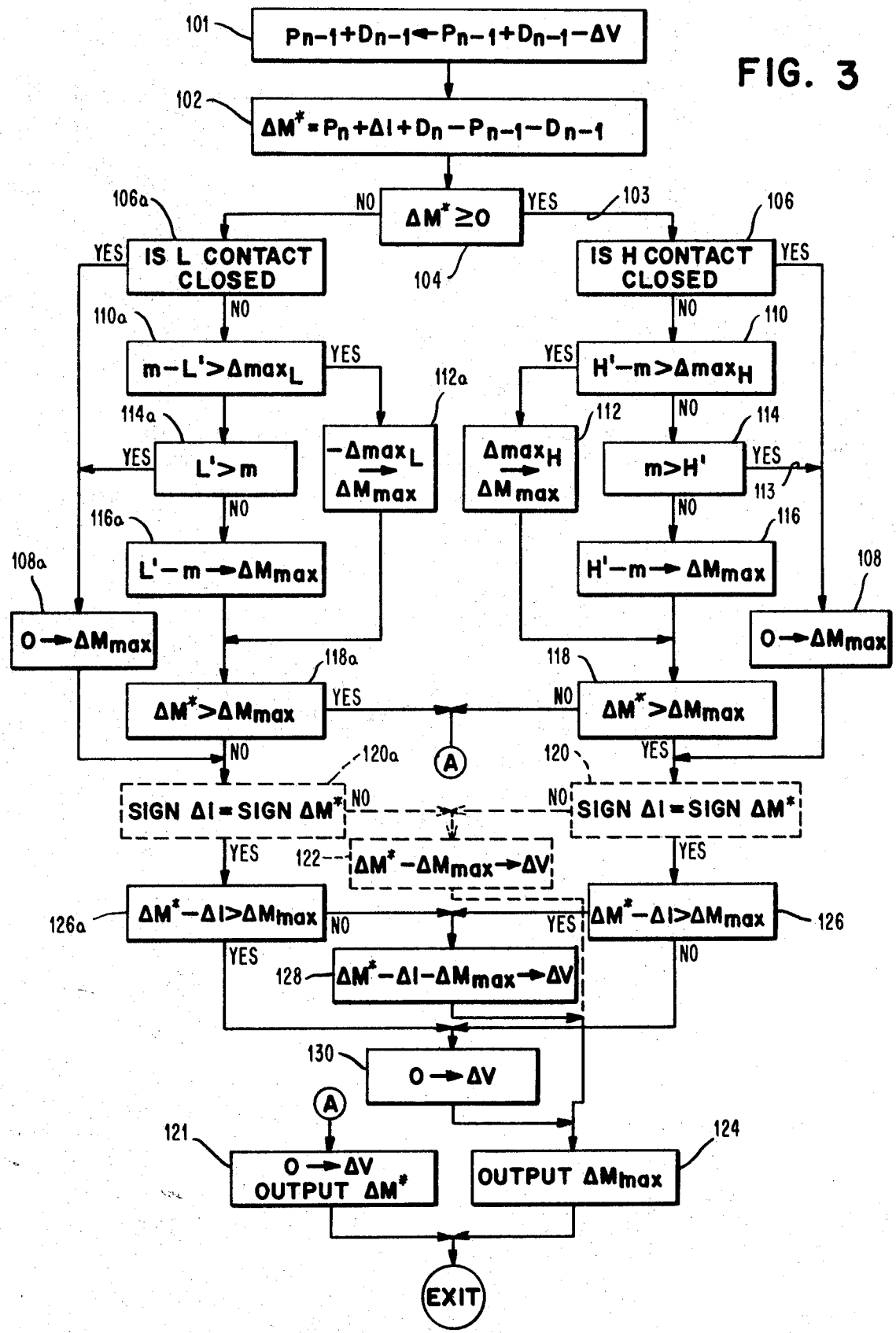
FIG. 3 is a flow sheet showing the steps which can be utilized to carry out the novel method using a velocity algorithm.

In FIG. 3 the value of the stored quantities $P_{n11}$ and $D_{n11}$ which are used with the velocity algorithm are added to the value of the windup correcting signal $\Delta V$ which was stored during the previous control interval ($n-1$) as shown in block 101 and the sum arrived at by adding those two values is then added as terms of the velocity algorithm as indicated by the statement in block 102 to determine $\Delta M^*$. The next step, which is indicated by the statement in block 104 involves the examination of the value placed in memory location $\Delta M^*$ as a result of the step of block 102 to determine if it is greater than zero or, in other words, to determine the sign. If, for example, the sign is positive, then one follows the "yes" path 103 to the next step, that shown in block 106. The statement in block 106 calls for the determination as to whether or not the H contact is closed or, in other words, whether or not the valve 16 has reached its high limit. If that limit has been reached, then the next step would be to store a zero in the $\Delta M_{max}$ portion 56 of the memory (FIG. 1) as indicated by the statement in block 108, otherwise the next step to be taken would be that as called for by the statement in block 110, namely the subtraction of $m$ (the actual position of the valve 16) from H' (a preset limit for the position of valve 16) and determining whether or not the difference is greater than $\Delta max_H$ (the maximum change in valve position which can be accomplished in an increase direction during a control interval due to velocity limiting of the motor 18). If the difference H'$-m$ is greater than $\Delta max_H$, then it is evident that the maximum change in position of the valve can be made by motor 18. Therefore, the statement in block 112 is followed; namely, loading of the value $\Delta max_H$ into the memory location $\Delta M_{max}$ (56 of FIGS. 1 and 2).

On the other hand, if the difference is not greater than $\Delta max_H$, then the step called for by the statement in block 114 is followed; namely, the value $m$ is examined to see if it is greater than the value H'. This step is effective to determine if the actual position of the valve is beyond the desired maximum position. If that is the case, the path noted by line 113 is followed and the step stated in block 108 is followed; namely, the loading of the value zero in the memory position $\Delta M_{max}$. If $m$ is not greater than H', then the step stated in block 116 is followed; namely, $m$ is subtracted from H' to obtain the value indicative of the change in valve position which can be made during the control interval without exceeding the high limit H' and that magnitude of change is then loaded in the memory position $\Delta M_{max}$.

Following the step stated in block 116 is the step stated in block 118. As noted in FIG. 3, the step stated in block 118 may follow either the step of block 116 or that of block 112 depending upon which path is followed after the step of block 110. As indicated by the statement in block 118, the value of the signal stored in $\Delta M^*$ is examined to see whether it is greater than the value stored in the memory position $\Delta M_{max}$ or, in other words, to determine whether or not the desired change in valve position for the control interval is greater than the maximum possible change which can be made within the constraints of the system. If the magnitude of the change desired, as indicated by the magnitude of the word stored in the $\Delta M^*$, is not greater than the magnitude of the maximum change which can be made, the next step will be that stated in block 121; namely, outputting the value in $\Delta M^*$ and loading a zero in the $\Delta V$ section of the memory followed by any steps which may be necessary in subsequent programs as indicated by the "exit" symbol.

From the above it may be seen that there is first determined the desired change in the manipulated variable for the control interval, namely $\Delta M^*$, in accordance with the measured deviation of the controlled variable and the windup correcting signal by means of the velocity algorithm. The sign of the value stored as $\Delta M^*$ is then examined and following that examination there is determined, as by means of blocks 106, 108, 110, 112, 114 and 116, what value will be stored in the memory as representative of the maximum change which the motor 18 is capable of making in the valve position. Having determined the maximum change and the desired change those two are then compared, and should the desired change not exceed the maximum possible change, the desired change is then outputted and is carried out by the control system as described in FIGS. 1 and 2.

While the description above has been concerned with the steps which would be taken to determine the maximum possible change in valve position if the value stored in the accumulator is positive after the step outlined in block 102, it will be evident from FIG. 3 that parallel steps are taken to determine the maximum value of the valve position change which can be accomplished should the value stored in $\Delta M^*$, as a result of the step in block 102 be negative in sign. These parallel steps are respectively stated in the block 106a, 108a, 110a, 112a, 114a and 116a with the various steps carried out as stated with regard to the correspondingly numbered blocks which do not contain the "a" suffix.

Likewise, the step stated in block 118a is precisely the same or parallel to the step stated in block 118, and determines whether or not the value in $\Delta M^*$ algebraically exceeds the possible change which can be made as indicated by the value in the storage position $\Delta M_{max}$. If the value in $\Delta M^*$ indeed algebraically exceeds the value stored in $\Delta M_{max}$ by being more negative then the value in $\Delta M^*$, then the value in $\Delta M^*$ can be outputted without exceeding the constraints of the system. Thus, there would be an outputting of the value $\Delta M^*$ and a placing of a zero in the $\Delta V$ position, as stated in block 121.

In the situation where the magnitude or, in other words, the absolute value of the value stored in $\Delta M^*$ is greater than that stored in the position $\Delta M_{max}$, it would then be evident that the amount of change in valve position made during the control interval is limited by the constraints such as the velocity limit in the motor 18 or the amount of travel which can be accomplished by the valve 16 and it is necessary to determine whether any of the amount by which the value $\Delta M^*$ exceeds the maximum possible change is to be retained as a windup correction signal and used in the next or subsequent control interval as a windup correcting signal to prevent incorrect storage of information which would degrade the overall control response. To make this determination one of the first steps which can be followed is to examine the sign of the integral or reset portion of the velocity algorithm symbolically identified as $\Delta I$ and to determine if that sign is the same as the sign of the value stored in the accumulator as indicated by the step stated in blocks 120 and 120a, depending upon the path which is being followed. If those signs are not the same, then the step shown in block 122 would be followed; namely, the value stored in $\Delta M_{max}$ would be subtracted from the value $\Delta M^*$, and the resultant difference would be placed in the $\Delta V$ storage position as a windup correcting signal to be used in the next control interval and there would be outputted the maximum possible change in valve position; namely, that value stored in $\Delta M_{max}$ as stated in block 124. Alternatively, if the signs were equal, that is, if the sign of $\Delta I$ was equal to the sign of the value $\Delta M^*$, then either the step stated in blocks 126 or 126a would be taken, depending upon the path being followed. That step compares the value of the reset or integral action $\Delta I$ with the value $\Delta M^*$ to see if the value of reset action when subtracted from the value $\Delta M^*$ is greater than the maximum possible change as stored in $\Delta M_{max}$. If the total value $\Delta M^*$ minus the reset portion is greater than the maximum possible change in the valve position, it is indicative of the fact that there is some part of the proportional and rate action which will not be outputted when the maximum possible output is accomplished. Since it is desirable not to incorrectly store the value of the proportional or rate action during the particular control interval it is desirable to store that portion which cannot be outputted as windup correction signals and make use of those values in subsequent control intervals. Therefore, under such a situation the next step to be followed by the computer would be to make the calculation stated in block 128, namely, to subtract the reset portion as well as the value of the maximum possible change which is to be outputted from the total value $\Delta M^*$, so as to determine that part of the proportional and rate action which will not be used and to then load that value in $\Delta V$ as a windup correction signal. After accomplishing that step as stated in the block 128 there is then outputted the value $\Delta M_{max}$ as stated in block 124.

In the event that the comparison stated in block 126 or that stated in 126a is indicative of the fact that there is no proportional and rate action which cannot be outputted during the control interval, then the next step to be followed would be that stated in block 130, namely a loading of the value zero in $\Delta V$ indicating that no windup correction signal is necessary during the subsequent control interval. The step stated in block 130 is then followed by the step stated in block 124, namely the outputting of the value $\Delta M_{max}$.

It is possible certain systems can effect an adequate control while omitting the steps stated in blocks 120, 120a and 122, which have been shown in FIG. 3 by dashed lines.

The computer may be programmed to utilize a position algorithm instead of a velocity algorithm, thus the algorithm may be in the form $\Delta M^* = P_n + \Delta I + D_n + I_{n11} - M_{n11}$ where:

$I_{n11}$ is the integral or reset action calculated for the control intervals through $n-1$ as modified by the windup correction signal $\Delta V$ $M_{n11}$ is the valve position computed during the control interval $n-1$ When utilizing the position algorithm, the windup which occurs due to constraints placed on the velocity of the motor 18, for example, occurs due to an incorrect storage of the value $I_{n11}$ which must be corrected by the windup correcting signal $\Delta V$ whenever the constraints on the velocity of motor 18 can move will not allow all of the reset action calculated for the period $n-1$, namely $I_{n11}$, to be utilized.

Figure 4:
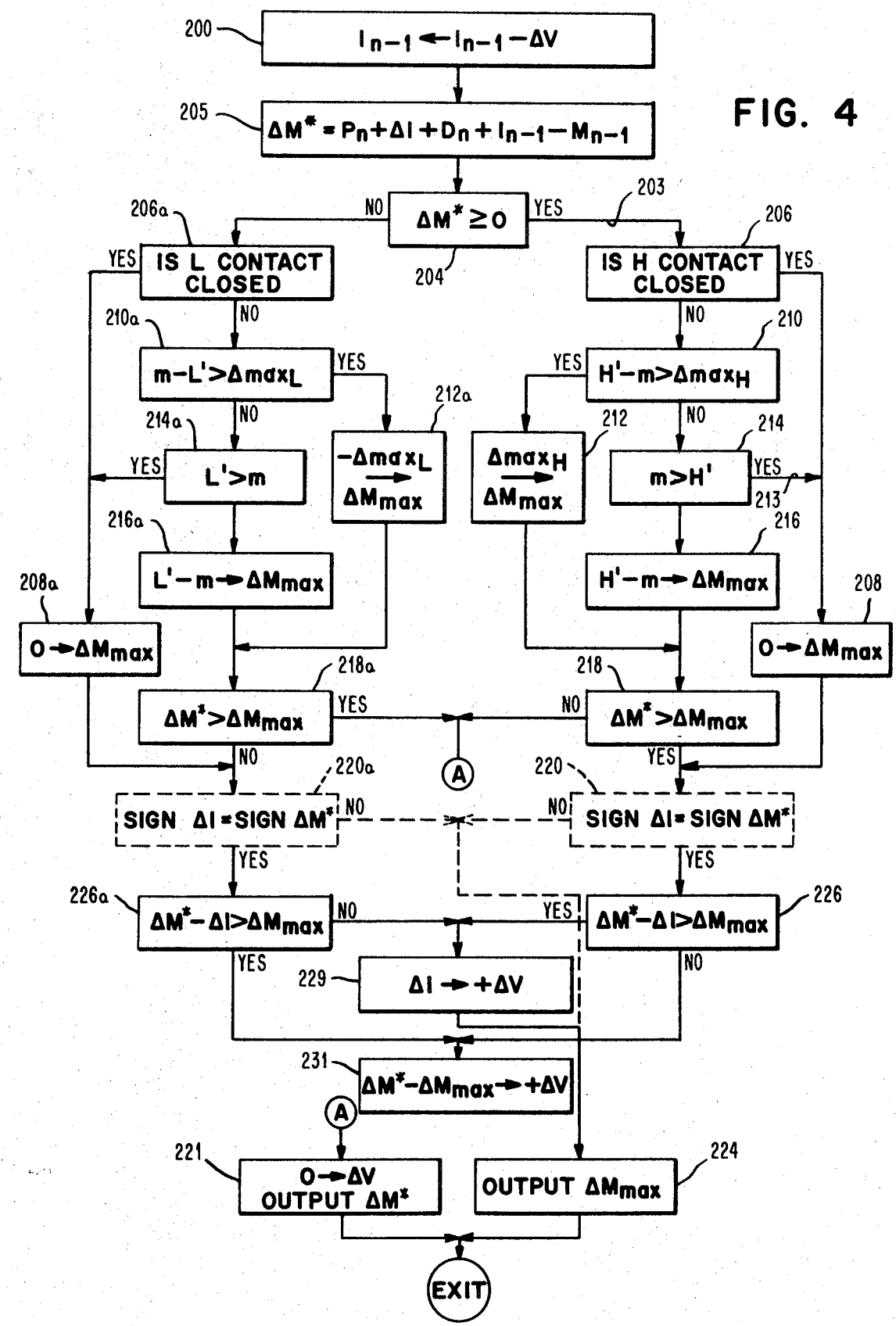
FIG. 4 is a flow sheet showing the steps which can be utilized to carry out the novel method using a position algorithm.

Thus, in the flow chart of FIG. 4 which sets forth the steps to be carried out by the digital computer 24 or computer 24a in order to minimize windup which might occur as a result of the use of the position algorithm, the first step of the method is that shown in block 200, namely a correction of the stored reset action, to take into account that part of the reset action which was not outputted during a previous control interval to obtain a corrected value for the reset term which is then used to calculate $\Delta M^*$ as shown in the equation of block 205.

The remainder of the steps as shown in FIG. 4, which are identified by reference numerals in the 200 series corresponding with the reference numerals of FIG. 3 in the 100 series, are steps similar to those shown and described with reference to FIG. 3.

The step shown by block 122 of FIG. 3 has no counterpart in FIG. 4. The other difference shown by FIGS. 3 and 4 are the change in the steps shown in FIG. 3 by blocks 128 and 130. When using the position algorithm, instead of storing the quantity shown in FIG. 3 by block 128, the quantity $\Delta I$ is stored as shown in block 229 of FIG. 4. Also, the step shown in block 130 of FIG. 3 is replaced by the step shown as block 231 of FIG. 4 wherein the quantity $\Delta M^*$ has subtracted from it $\Delta M_{max}$ in order to determine the windup correcting signal stored in $\Delta V$. Other than these changes the steps we carried out for the correction of the windup does not differ between the position algorithm as represented by FIG. 4 and the velocity algorithm as represented by FIG. 3. Basically, the step of block 229 causes a storage of the windup correction signal as the value $\Delta I$ or, in other words, all of the reset action, since by the test shown in block 226 it would become evident that none of the reset action was outputted, and therefore a correction of that magnitude must be made.

If the test of block 226 is answered in the negative, then the calculation shown in block 231 is made to determine that portion of the reset action which could not be outputted so that the portion of the reset action can become the windup correction signal.

It will be evident to those skilled in the art that the series of steps necessary to determine the output from the digital computer to the positioning motor 18 may be determined by following any one of several possible sequences of the types described above, it being only significant that the steps be carried out as generally set forth in the Summary of the Invention. The flow sheets of FIGS. 3 and 4 show one particular configuration as an example of logical arrangements which can be used.

What I claim is:

1. The method for automatically calculating valves for the control signal necessary to provide control action during each control interval of a digital computer control system to correct a process variable with minimum windup from constraints placed on the control action, comprising the steps of:

automatically calculating the desired change in the manipulated variable for each control interval in accordance with the computed deviation of the controlled variable from its set point as modified by a previously stored windup correcting signal, automatically calculating the maximum change in the manipulated variable permissible during each control interval in accordance with said constraints, automatically comparing said maximum change and said desired change, automatically producing in response to said comparison a control signal which is of magnitude sufficient to effect said desired change when said desired change does not exceed in magnitude said maximum change and sufficient to effect said maximum change when said desired change does exceed said maximum change, and automatically producing and storing the windup correcting signal for the next subsequent control interval by automatically calculating the desired change in the manipulated variable which could not be effected during the control interval for which it was calculated due to the existence of said constraints.

2. The method of claim 1 in which the calculation of the desired change in the manipulated variable for each control interval is computed in accordance with a velocity algorithm and in which the windup correcting signal includes the part of the proportional and rate portion of a control signal which are not outputted.

3. The method of claim 1 in which the calculation of the desired change in the manipulated variable for each control interval is in accordance with a position algorithm and in which the windup correcting signal is calculated as that part of the reset portion of the control signal not effected during the control interval.

4. The method for calculating the control signal necessary to provide control action during each control interval of a digital computer control system to correct a process variable with maximum windup from constraints placed on the control action, comprising the steps of:

producing a desired control signal representative of the desired change in the manipulated variable for a particular control interval as modified by a windup correcting signal, storing in memory said desired control signal, calculating a maximum control signal representing the maximum permissible control action for the particular control interval, storing in the memory said maximum control signal, comparing the value of the stored desired control signal with the value of the stored maximum control signal, outputting said desired control signal and storing a zero value signal as the windup correction signal when the magnitude of the desired control signal does not exceed the magnitude of the stored maximum control signal, outputting the stored maximum control signal and updating the value of the windup correcting signal when the magnitude of the desired control signal exceeds the magnitude of the stored maximum control signal, said updating including producing a signal representing the difference between the stored maximum control signal and the stored desired control signal and storing the difference as the windup correcting signal when the sign of the reset portion of the desired control signal for the control interval is not the same as the sign of the stored desired control signal, and producing a signal representing the difference between the sum of the stored maximum control signal and any fraction of the reset portion of the desired control signal which cannot be utilized from the stored control signal and storing the difference as a correcting signal when the sign of said reset portion is the same as the sign of said desired control signal.

5. The method as set forth in claim 4 in which the calculation of the maximum control signal comprises the steps of storing a zero value signal as the maximum control signal when the control element of the system has reached a limit in the direction associated with said stored desired control signal, storing as the maximum control signal a signal representative of the maximum change which the final control element can effect in the direction associated with the stored desired control signal during one control interval when the difference between the position of the final control element and its limit value in the direction it is to be moved is greater than said maximum change, and storing as the maximum control signal a signal representative of the difference between the limit established for the final control element position in the direction associated with the stored desired control signal and the actual position of the final control element when said difference is not greater than the maximum change which the final control element can effect during one control interval.

UNITED STATES PATENT OFFICE

PO-1050
(5/69)

CERTIFICATE OF CORRECTION

Patent No. 3,582,629     Dated June 1, 1971

Inventor(s) Charles W. Ross

It is certified that error appears in the above-identified patent and that said Letters Patent are hereby corrected as shown below:

Column 4, line 28, "DAn - $P_{n11}$ - $D_{n11}$" should read --$D_n$ - $P_{n-1}$ - $D_{n-1}$--

Column 4, line 51, "$P_{n11}$ + $D_{n11}$" should read --$P_{n-1}$ + $D_{n-1}$--

Column 4, line 58, "DAn + $I_{11}$ - $M_{n11}$" should read --$D_n$ + $I_{n-1}$ - $M_{n-1}$--

Column 4, line 63, "Mn - 1c" should read --$M_{n-1}$--

Column 4, line 65, "$I_{n11}$" should read --$I_{n-1}$--

Column 5, line 8, "$P_{n11}$ and $D_{n11}$" should read --$P_{n-1}$ and $D_{n-1}$--

Column 7, line 28, "$I_{n11}$ - $M_{n11}$" should read --$I_{n-1}$ - $M_{n-1}$--

Column 7, line 30, "$I_{n11}$" should read --$I_{n-1}$--

Column 7, line 33, "$M_{n11}$" should read --$M_{n-1}$--

Column 7, line 38, "$I_{n11}$" should read --$I_{n-1}$--

Column 7, line 41, "$I_{n11}$" should read --$I_{n-1}$--

Column 8, line 4, "the portion" should read --that portion"
Column 8, line 16, "valves" should read --values--
Column 8, line 59, "maximum" should read --minimum--

Signed and sealed this 18th day of April 1972.

(SEAL)
Attest:

EDWARD M. FLETCHER, JR.
Attesting Officer

ROBERT GOTTSCHALK
Commissioner of Patents